(No Model.)
A. STOCKDALE.
CAR MOVER.
No. 369,413.  Patented Sept. 6, 1887.
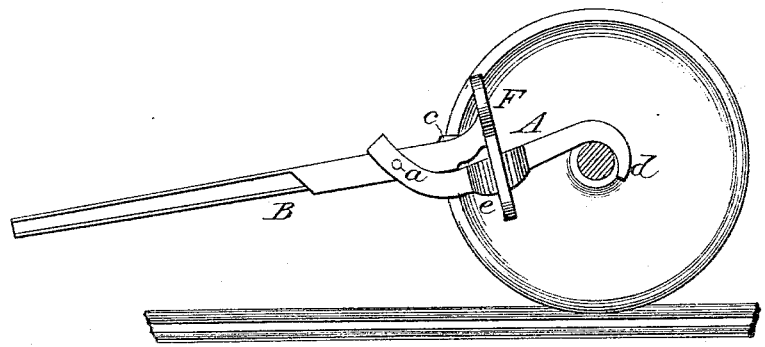
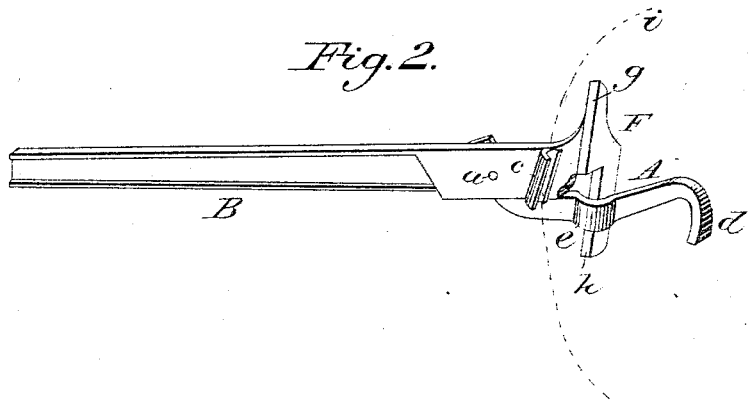

UNITED STATES PATENT OFFICE.

ALEXANDER STOCKDALE, OF WOLCOTT, IOWA.

CAR-MOVER.

SPECIFICATION forming part of Letters Patent No. 369,413, dated September 6, 1887.

Application filed June 7, 1887. Serial No. 240,559. (No model.)

*To all whom it may concern:*

Be it known that I, ALEXANDER STOCKDALE, of Wolcott, in the county of Scott and State of Iowa, have invented a new and useful Improvement in Car-Movers, of which the following is a specification.

My invention relates to an improved car-mover having as its object to provide a grooved clutch attached to an arm fulcrumed upon the car-wheel axle, which clutch is wedged upon the flange rising from the rim of the car-wheel, by raising the outer end of said arm, thus causing the wheel to rotate, and is released by lowering the outer end of said arm, for the purpose of rewedging said clutch on said flange and further rotating said wheel, or for removing the device.

The invention consists in certain features of construction and novel combinations of parts, as will be described.

In the drawings, Figure 1 is a side view of the inner side of a car-wheel and a side view of my device when in position for operation. Fig. 2 is a perspective view of the opposite side of my improved car-mover, the dotted lines representing the flange rising from the rim of the wheel.

Similar letters refer to similar parts throughout the several views.

An axle-hook, A, is pivoted near the end of its arm by the bolt *a* to the arm B. Upon the side of arm B is the grooved clutch *c* in an angular position, substantially as shown in Fig. 2. The groove in the upper portion of clutch *c* is elliptical, so that it will wedge upon or bite the flange rising from the rim of the car-wheel, while the lower portion of said groove is circular, so that it will slide upon such flange.

The axle-hook A is provided with a hook, *d*, of proper size to grasp around the axle of the car-wheel, and midway between said hook *d* and the pivot or bolt *a* the arm is bent, as shown at *e*.

At the inner end of arm B is a bar, F, which acts as a guide, its upper portion, *g*, resting against the inner surface of the car-wheel, its lower portion, *h*, being recessed to guide and hold in line vertically the part *e* of the arm of axle-hook A.

The operation is simple and will be readily understood. When the parts are in position, the axle-hook at its point *d* clasping the axle of the car-wheel, the arm B is lowered at its outer end sufficient to allow the flange rising from the rim of the car-wheel to be in line and in front of the grooved clutch *c*. The arm B is then raised, moving upon the bolt or pivot *a*, thus throwing the upper portion of the groove in clutch *c* around and against the flange of the car-wheel, and the elliptical form of the groove causes it to wedge upon or bite said flange, and the continued upward movement of the outer end of arm A upon the fulcrum at *d* and the wedging of clutch *c* upon the flange of the car-wheel causes the wheel to rotate. The dotted circular lines *i* in Fig. 2 show the position of the flange of the car-wheel in groove of clutch *c*.

When the operator desires, the arm B is lowered, which action throws off the upper portion of the grooved clutch *c* from the flange of the wheel and forces the lower or circular part of the groove of clutch *c* nearer the flange, and thus permits the clutch *c*, arm B, and arm of axle-hook A to move downward without rotating the wheel. That portion of bar F at *g* rests against the inner surface of the wheel, and its lower portion, *h*, holds the axle-hook A in position, and arm B and axle-hook A are thus held vertically in line when in operation. As often as the arm B is lowered, so that the clutch *c* will loose its hold upon said flange, it may be again raised and wheel further rotated, as herein described. The device is released from the car-wheel by lowering the arm B sufficiently to disengage the hook *d* from the axle.

I have described what I deem the best method for constructing my car-mover; but it will be seen that, if desired, the axle-hook A and arm B may be pivoted together at a point between the axle and circumference of the wheel and the shape and form of the device changed. The guide formed by bar F may be omitted, or the heads of bolt *a* may be so constructed as to act as a guide for holding axle-hook A and bar B vertically in line.

Having thus described my invention, what I claim as new, and desire to secure by Letters Patent, is—

The arm provided with the clutch and guide, in combination with the axle-hook pivoted to said arm, substantially as described.

ALEXANDER STOCKDALE.

Witnesses:
   J. W. STEWART,
   JOSEPH FLEISHMAN.